US012573089B2

(12) United States Patent
Kobori et al.

(10) Patent No.: US 12,573,089 B2
(45) Date of Patent: Mar. 10, 2026

(54) VISUAL POSITIONING SYSTEM

(71) Applicant: TOYOTA JIDOSHA KABUSHIKI KAISHA, Aichi-ken (JP)

(72) Inventors: Norimasa Kobori, Nakano-ku (JP); Quan Kong, Toshima-ku (JP); Hsuan-Kung Yang, Sumida-ku (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 91 days.

(21) Appl. No.: 18/608,941

(22) Filed: Mar. 19, 2024

(65) Prior Publication Data

US 2024/0386605 A1 Nov. 21, 2024

(30) Foreign Application Priority Data

May 19, 2023 (JP) ................................. 2023-083329

(51) Int. Cl.
  *G06T 7/73* (2017.01)
  *G06T 7/11* (2017.01)
  *G06T 7/50* (2017.01)
  *G06T 15/20* (2011.01)

(52) U.S. Cl.
  CPC ................. *G06T 7/74* (2017.01); *G06T 7/11* (2017.01); *G06T 7/50* (2017.01); *G06T 15/20* (2013.01); *G06T 2207/20072* (2013.01); *G06T 2207/30244* (2013.01); *G06T 2210/61* (2013.01)

(58) Field of Classification Search
  None
  See application file for complete search history.

(56) References Cited

U.S. PATENT DOCUMENTS

| 2011/0043627 A1* | 2/2011 | Werling | G06T 17/05 |
| | | | 348/143 |
| 2013/0257858 A1* | 10/2013 | Na | A63F 13/211 |
| | | | 345/419 |
| 2016/0104452 A1* | 4/2016 | Guan | G06F 3/0304 |
| | | | 345/633 |
| 2020/0160114 A1 | 5/2020 | Wang et al. | |
| 2023/0118864 A1 | 4/2023 | Zhang et al. | |

FOREIGN PATENT DOCUMENTS

| JP | 2000-275013 A | 10/2000 |
| JP | 2013182523 A | 9/2013 |
| JP | 2020-526860 A | 8/2020 |
| JP | 2022-081081 A | 5/2022 |
| JP | 2023059794 A | 4/2023 |

* cited by examiner

*Primary Examiner* — Frank S Chen
(74) *Attorney, Agent, or Firm* — HAUPTMAN HAM, LLP

(57) ABSTRACT

A first world is one of a real world and a virtual world simulating the real world, and a second world is another of them. A first image is captured by a first camera in the first world, and a second image is captured by a second camera in the second world. A visual positioning system executes common processing that generates a scene graph representing a positional relationship between objects included in the image and extracts a feature amount of the scene graph. The visual positioning system performs matching between a first feature amount extracted by the common processing on the first image and a second feature amount extracted by the common processing on the second image, and then associates the first camera position in the first world and the second camera position in the second world with each other based on a result of the matching.

5 Claims, 6 Drawing Sheets

100: VISUAL POSITIONING SYSTEM

VISUAL POSITIONING SYSTEM

CROSS-REFERENCES TO RELATED APPLICATION

The present disclosure claims priority to Japanese Patent Application No. 2023-083329, filed on May 19, 2023, the contents of which application are incorporated herein by reference in their entirety.

TECHNICAL FIELD

The present disclosure relates to a visual positioning technique that identifies a position based on an image captured by a camera.

BACKGROUND ART

Patent Literature 1 discloses an image learning apparatus. The image learning apparatus uses a 3-dimensional computer graphics image acquired in a virtual space to perform training of a machine learning model used for object recognition in a real space. A camera is installed at a fixed position in the real space, and information on the camera viewpoint is obtained based on a position and an orientation of the camera. Based on the information on the camera viewpoint, a virtual camera is arranged in a virtual space.

LIST OF RELATED ART

Patent Literature 1: Japanese Laid-Open Patent Application No. JP-2022-081081

SUMMARY

Visual positioning is a technique for identifying a position based on an image captured by a camera. Associating a position in a real world with a position in a virtual world by the use of the visual positioning has not been considered in the past. An object of the present disclosure is to provide a technique capable of associating a position in a real world with a position in a virtual world by using visual positioning.

An aspect of the present disclosure is directed to a visual positioning system that identifies a location based on an image captured by a camera.

A first world is one of a real world and a virtual world simulating the real world.

A second world is another of the real world and the virtual world.

A first image is an image captured by a first camera in the first world.

A second image is an image captured by a second camera in the second world.

The visual positioning system includes one or more processors.

The one or more processors execute common processing that generates a scene graph representing a positional relationship between objects included in the image and extracts a feature amount of the scene graph.

The one or more processors perform matching between a first feature amount extracted as a result of the common processing on the first image and a second feature amount extracted as a result of the common processing on the second image.

The one or more processors associate a position of the first camera in the first world and a position of the second camera in the second world with each other based on a result of the matching.

According to the present disclosure, the feature amount is extracted from the image by the common processing. More specifically, the common processing does not extract the feature amount from the image itself, but first abstracts the image to generate the scene graph and then extracts the feature amount of the scene graph. A difference in a fine structure between the real world and the virtual world is absorbed by the abstraction of the image. Therefore, consistency between the real world and the virtual world is secured at the level of the feature amount. Thus, the feature amounts respectively extracted from the real image and the virtual image captured at the same camera viewpoint sufficiently match with each other. Since the feature amounts related to the same camera viewpoint sufficiently match with each other, it is possible to perform the visual positioning with high accuracy. As a result, it is possible to associate the camera viewpoint in the real world with the camera viewpoint in the virtual world with high accuracy.

DETAILED DESCRIPTION

1. Overview

Visual positioning is a technique for identifying a position based on an image captured by a camera. First, a database (gallery) is generated in advance based on a first image captured by a first camera. More specifically, a first feature amount, which is a feature amount of the first image, is extracted by a predetermined feature amount extraction process. Then, a correspondence relationship between the first feature amount and a camera viewpoint of the first camera when the first image is captured is accumulated in the database. The camera viewpoint is defined by a combination of a position and an orientation of the camera in an absolute coordinate system.

A process for identifying a position of a second camera is as follows. First, a second image captured by the second camera is obtained as a query. Further, a second feature amount, which is a feature amount of the second image, is extracted by the same feature amount extraction process as that for the first feature amount of the first image. Then, a matching process that searches the database for a matching entry having the first feature amount that matches the second feature amount is performed. The camera viewpoint included in the obtained matching entry is determined to be the camera viewpoint (i.e., the position and orientation) of the second camera.

Such the visual positioning makes it possible to identify a position without using a global navigation satellite system (GNSS) or the like.

However, the conventional visual positioning is applied only to cameras present in a real world, and a virtual world is not taken into consideration. In view of the above, the present embodiment proposes a technique that can extend the visual positioning to the virtual world. In particular, the present embodiment proposes a technique capable of associating a real position in the real world with a virtual position in the virtual world by the use of the visual positioning.

Figure 1:
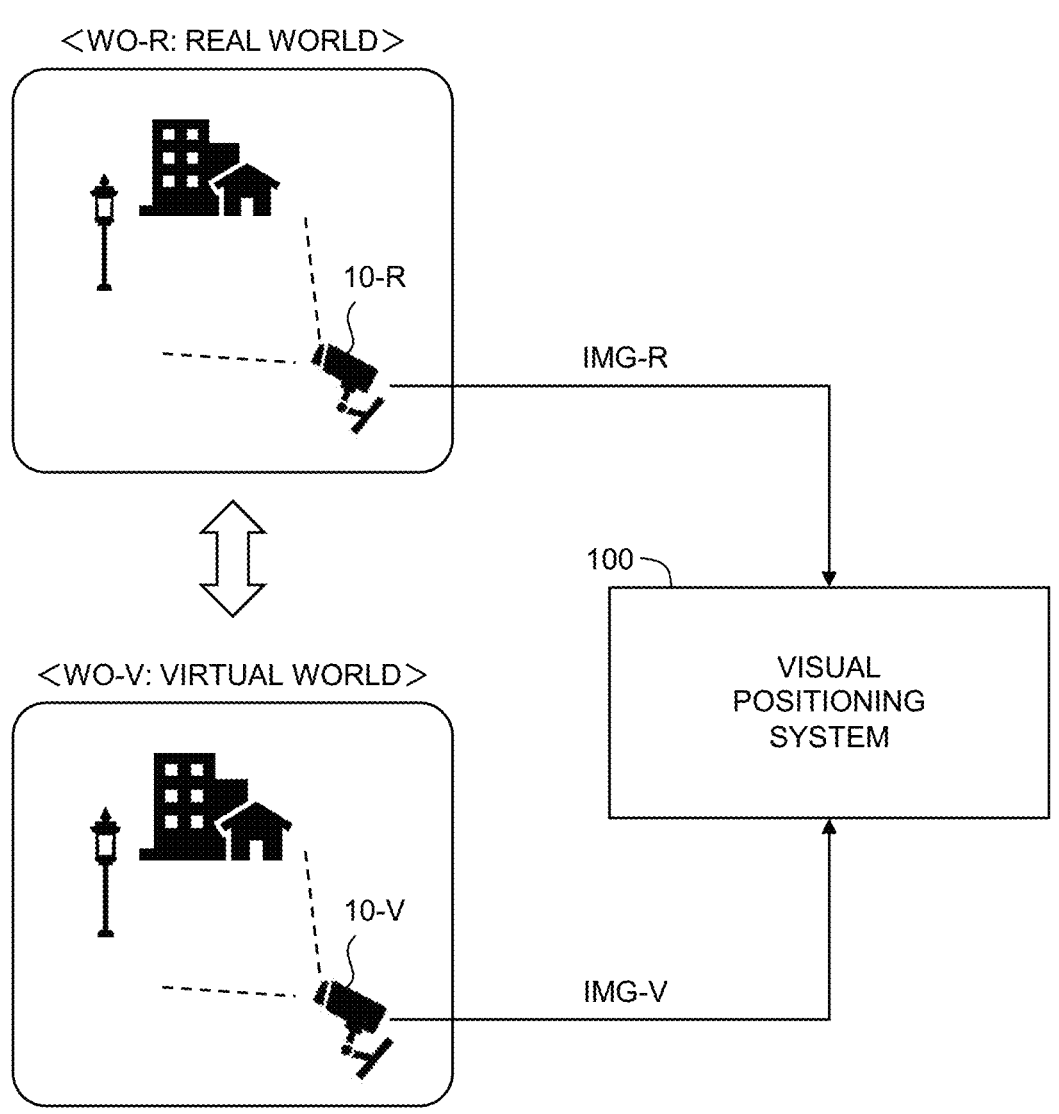
FIG. 1 is a conceptual diagram for explaining an overview of a visual positioning system according to an embodiment.

FIG. 1 is a conceptual diagram for explaining an overview of a visual positioning system 100 according to the present embodiment. In the following description, the visual position system 100 is referred to as a "VPS 100."

First, a predetermined area of a real world WO-R is considered. For example, the predetermined area is one town, one building, or the like. One or more real cameras 10-R are present in the predetermined area of the real world WO-R. The real camera 10-R may be a still camera (a fixed camera) or a moving camera mounted on a moving body. Examples of the moving body include a vehicle, a robot, and the like. A real image IMG-R of the predetermined area of the real world WO-R is captured by the real camera 10-R.

A virtual world WO-V is a world that simulates the real world WO-R. The virtual world WO-V is reproduced to be as similar as possible to the real world WO-R. For example, the virtual world WO-V is reproduced on a computer by the use of DigitalTwin technology. One or more virtual cameras 10-V are present in the predetermined area of the virtual world WO-V. The virtual camera 10-V may be a still camera (a fixed camera) or a moving camera mounted on a moving body. Examples of the moving body include a vehicle, a robot, and the like. A virtual image IMG-V of the predetermined area of the virtual world WO-V is captured by the virtual camera 10-V.

The VPS 100 acquires the real image IMG-R captured by the real camera 10-R and the virtual image IMG-V captured by the virtual camera 10-V. Then, the VPS 100 performs the visual positioning based on the real image IMG-R and the virtual image IMG-V.

For example, the database described above is generated based on the virtual image IMG-V (first image) captured by the virtual camera 10-V (first camera). In this case, the VPS 100 acquires the real image IMG-R (second image) captured by the real camera 10-R (second camera) as the query. The VPS 100 performs the visual positioning based on the database to obtain a camera viewpoint in the virtual world WO-V corresponding to the real image IMG-R. It can be also said that the obtained camera viewpoint in the virtual world WO-V is equal to the camera viewpoint of the real camera 10-R in the real world WO-R. That is, the camera viewpoint in the real world WO-R and the camera viewpoint in the virtual world WO-V are associated with each other.

As another example, the database described above may be generated based on the real image IMG-R (first image) captured by the real camera 10-R (first camera). In this case, the VPS 100 acquires the virtual image IMG-V (second image) captured by the virtual camera 10-V (second camera) as the query. The VPS 100 performs the visual positioning based on the database to obtain a camera viewpoint in the real world WO-R corresponding to the virtual image IMG-V. It can be also said that the obtained camera viewpoint in the real world WO-R is equal to the camera viewpoint of the virtual camera 10-V in the virtual world WO-V. That is, the camera viewpoint in the real world WO-R and the camera viewpoint in the virtual world WO-V are associated with each other.

Here, the inventor of the present application recognized the following point of view. That is, even for the same object, granularity (fineness) of its information may differ between the real world WO-R and the virtual world WO-V. For example, a structure of a building in the virtual world WO-V is represented by CAD data. The CAD data does not necessarily represent a fine structure of the actual building in the real world WO-R. That is, although the virtual world WO-V simulates the real world WO-R as much as possible, there may be an error with regard to the fine structure. In other words, the real image IMG-R and the virtual image IMG-V captured at the same camera viewpoint are substantially the same, but may have a difference in the fine structure. The feature amounts respectively extracted from such the real image IMG-R and virtual image IMG-V do not necessarily match with each other. If the feature amounts do not match with each other even though the camera viewpoints are the same, position identification accuracy is deteriorated or the visual positioning does not work well.

In order to perform the visual positioning with high accuracy, it is desirable to match the feature amounts related to the same camera viewpoint as much as possible. Even if there is a difference in the fine structure, it is desirable to secure consistency between the real world WO-R and the virtual world WO-V at least at a level of the feature amount.

In view of the above, the VPS 100 according to the present embodiment is configured to be able to secure the consistency between the real world WO-R and the virtual world WO-V at the feature amount level. For that purpose, the VPS 100 does not extract the feature amount directly from the original image IMG, but extracts the feature amount after applying a specific effort to the original image IMG. This processing is hereinafter referred to as "common processing."

Figure 2:
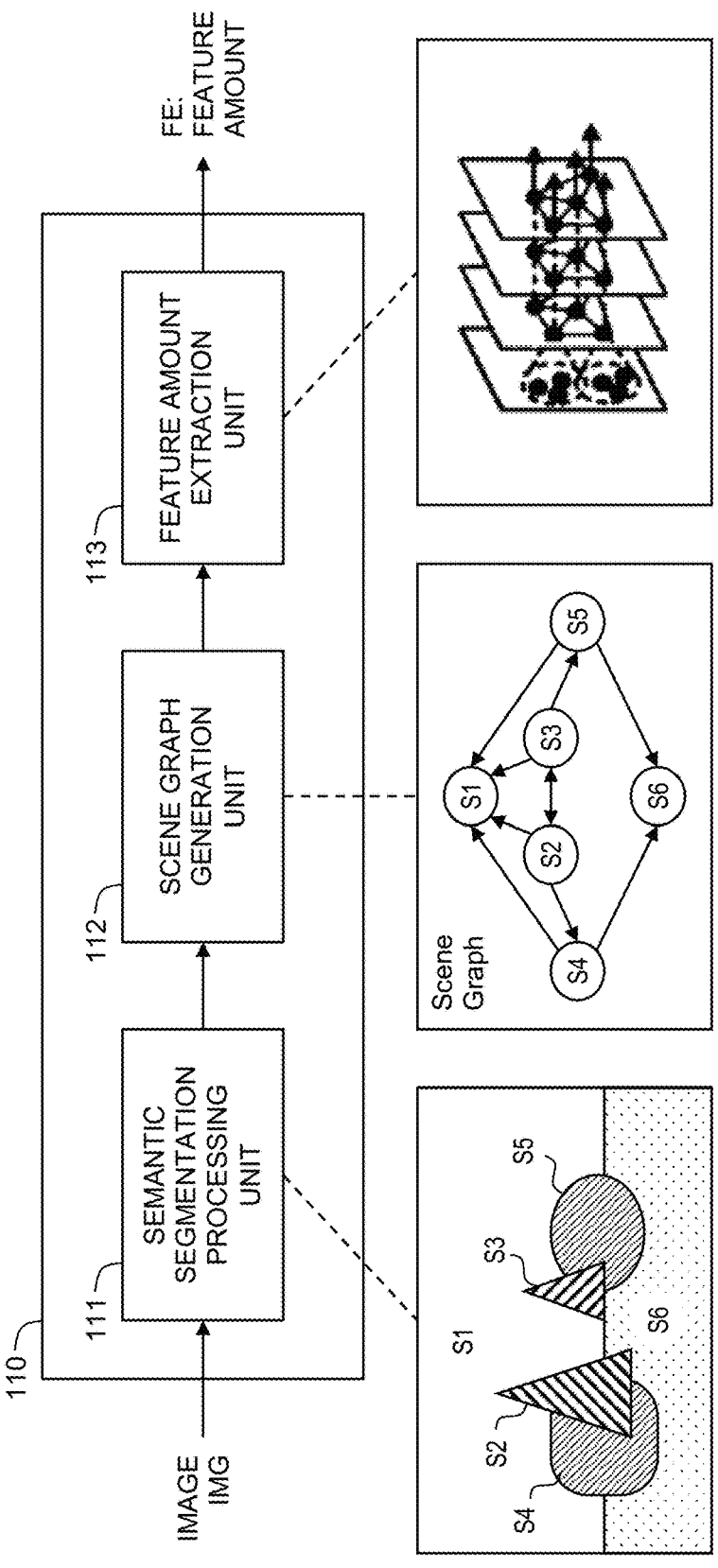
FIG. 2 is a conceptual diagram for explaining common processing according to an embodiment.

FIG. 2 is a conceptual diagram for explaining the common processing in the VPS 100. The VPS 100 includes a common processing unit 110 that executes the common processing. The common processing unit 110 receives the image IMG, performs the common processing on the image IMG, and extracts a feature amount FE. The common processing unit 110 includes a semantic segmentation processing unit 111, a scene graph generation unit 112, and a feature amount extraction unit 113.

The semantic segmentation processing unit 111 applies well-known semantic segmentation to the image IMG. The semantic segmentation divides the image IMG into a plurality of regions by categorizing each pixel of the image IMG and grouping together pixels of the same category. A region of the same category is hereinafter referred to as an "object." The object corresponds to any of various landmarks such as a building, a tree, a road, and the like. In the example shown in FIG. 2, the image IMG includes a plurality of objects S1 to S6. In this manner, performing the semantic segmentation makes it possible to detect and identify the objects included in the image IMG.

The scene graph generation unit 112 receives the result of the semantic segmentation. Then, the scene graph generation unit 112 generates a scene graph representing a positional relationship between a plurality of objects included in the image IMG. The scene graph has a graph structure, and each node corresponds to each object included in the image IMG. It should be noted that the scene graph generation (SGG) is a well-known technique.

The scene graph thus generated well represents features of a scene shown in the original image IMG. Meanwhile, in the scene graph, information of a very fine structure shown in the image IMG disappears. That is to say, the scene graph excludes the information of the fine structure while inheriting the features of the original image IMG. In other words, the scene graph is moderate abstraction of the original image IMG. Such the scene graph may also be referred to as mid-level representation of the image IMG.

The feature amount extraction unit 113 receives the scene graph from the scene graph generation unit 112. Then, the feature amount extraction unit 113 extracts the feature amount FE of the scene graph. For example, the feature amount FE of the scene graph is extracted by using a graph neural network (GNN).

According to the present embodiment, the feature amount FE is extracted from the image IMG by the common processing described above. More specifically, the common processing does not extract the feature amount FE from the image IMG itself, but first abstracts the image IMG to generate the scene graph and then extracts the feature amount FE of the scene graph. A difference in a fine structure between the real world WO-R and the virtual world WO-V is absorbed by the abstraction of the image IMG. Therefore, even if there is a difference in a fine structure between the real world WO-R and the virtual world WO-V, the difference disappears at the level of the feature amount FE. That is, the consistency between the real world WO-R and the virtual world WO-V is secured at the level of the feature amount FE. Therefore, the feature amounts FE respectively extracted from the real image IMG-R and the virtual image IMG-V captured at the same camera viewpoint sufficiently match with each other. Since the feature amounts FE related to the same camera viewpoint sufficiently match with each other, it is possible to perform the visual positioning with high accuracy. As a result, it is possible to associate the camera viewpoint in the real world WO-R with the camera viewpoint in the virtual world WO-V with high accuracy.

2. Modification of Common Processing

2-1. First Modification Example

Instead of the semantic segmentation, a well-known object detection process using a object detection model such as YOLOX may be performed. The object detection process makes it possible to detect objects shown in the image IMG.

2-2. Second Modification Example

There may be a case where a moving body is shown in the image IMG. Examples of the moving body include a vehicle, a pedestrian, an animal, and the like. The moving body is not always shown in the image IMG. Therefore, the moving body is noise for the feature amount FE. In view of the above, in the second modification example, the objects shown in the image IMG are classified into a static object and a dynamic object. Then, the scene graph is generated based only on the static objects without using the dynamic objects. This further improves the accuracy of the visual positioning.

2-3. Third Modification Example

As a result of the abstraction of the image IMG, the feature amounts FE related to different camera positions may match with each other by chance. In order to suppress such the matching of the feature amounts FE related to different camera positions, depth information of the image IMG is taken into consideration in the third modification example.

Figure 3:
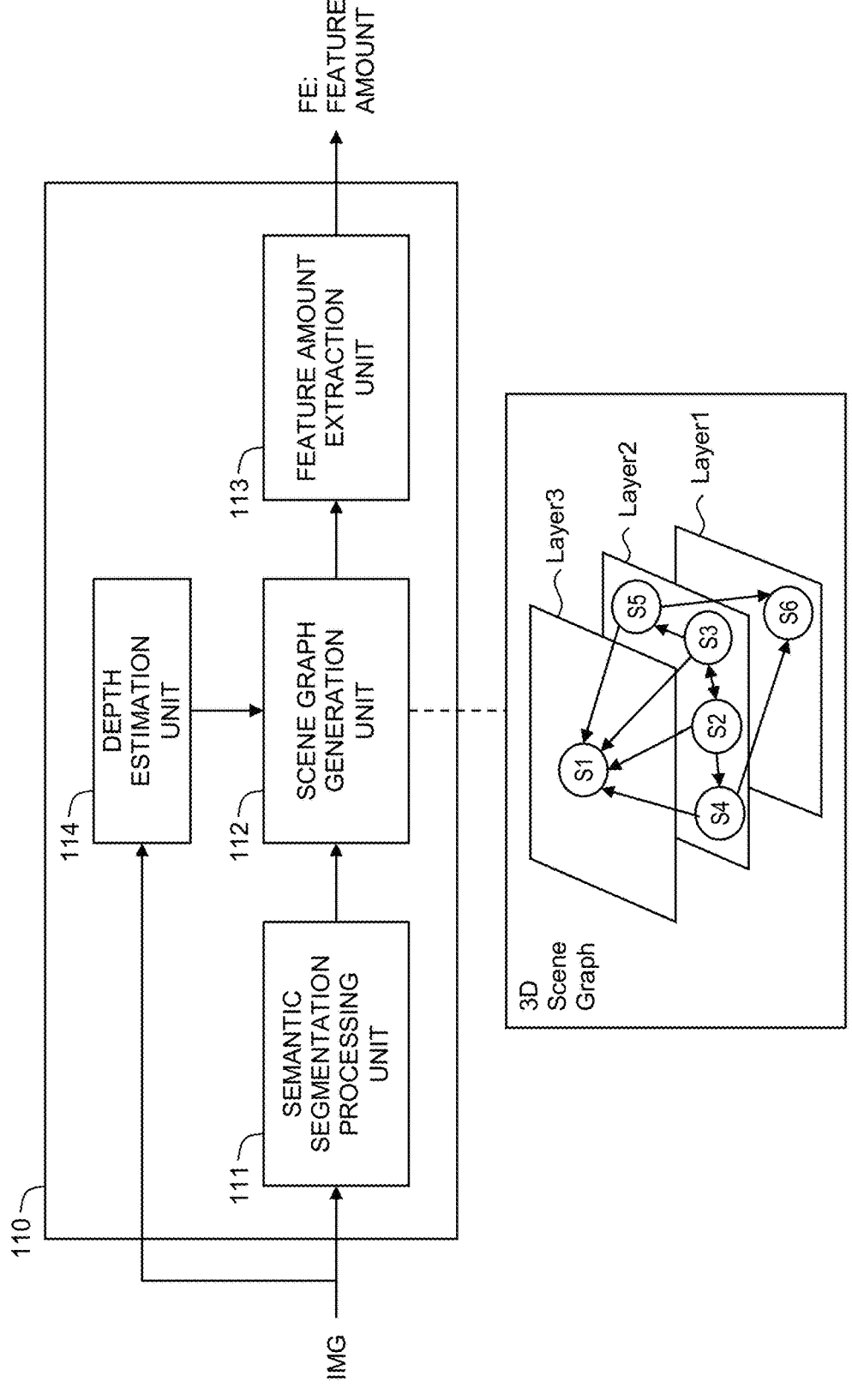
FIG. 3 is a conceptual diagram for explaining a modification example of the common processing according to an embodiment.

FIG. 3 is a conceptual diagram for explaining the third modification example. The common processing unit 110 further includes a depth estimation unit 114 in addition to the above-described functional blocks. The depth estimation unit 114 estimates depth of the image IMG to acquire a depth map of the image IMG. For example, the image IMG is an RGB image. A techniques for estimating the depth from the RGB image is well known.

The scene graph generation unit 112 receives the depth map of the image IMG from the depth estimation unit 114. Based on the depth map, the scene graph generation unit 112 generates a scene graph representing a three-dimensional positional relationship between a plurality of objects included in the image IMG. That is, the scene graph generation unit 112 combines the depth map with the two-dimensional scene graph to generate the three-dimensional scene graph. This suppresses the matching of the feature amounts FE related to different camera positions. As a result, the accuracy of the visual positioning is further improved.

3. Example of Visual Positioning System

Figure 4:
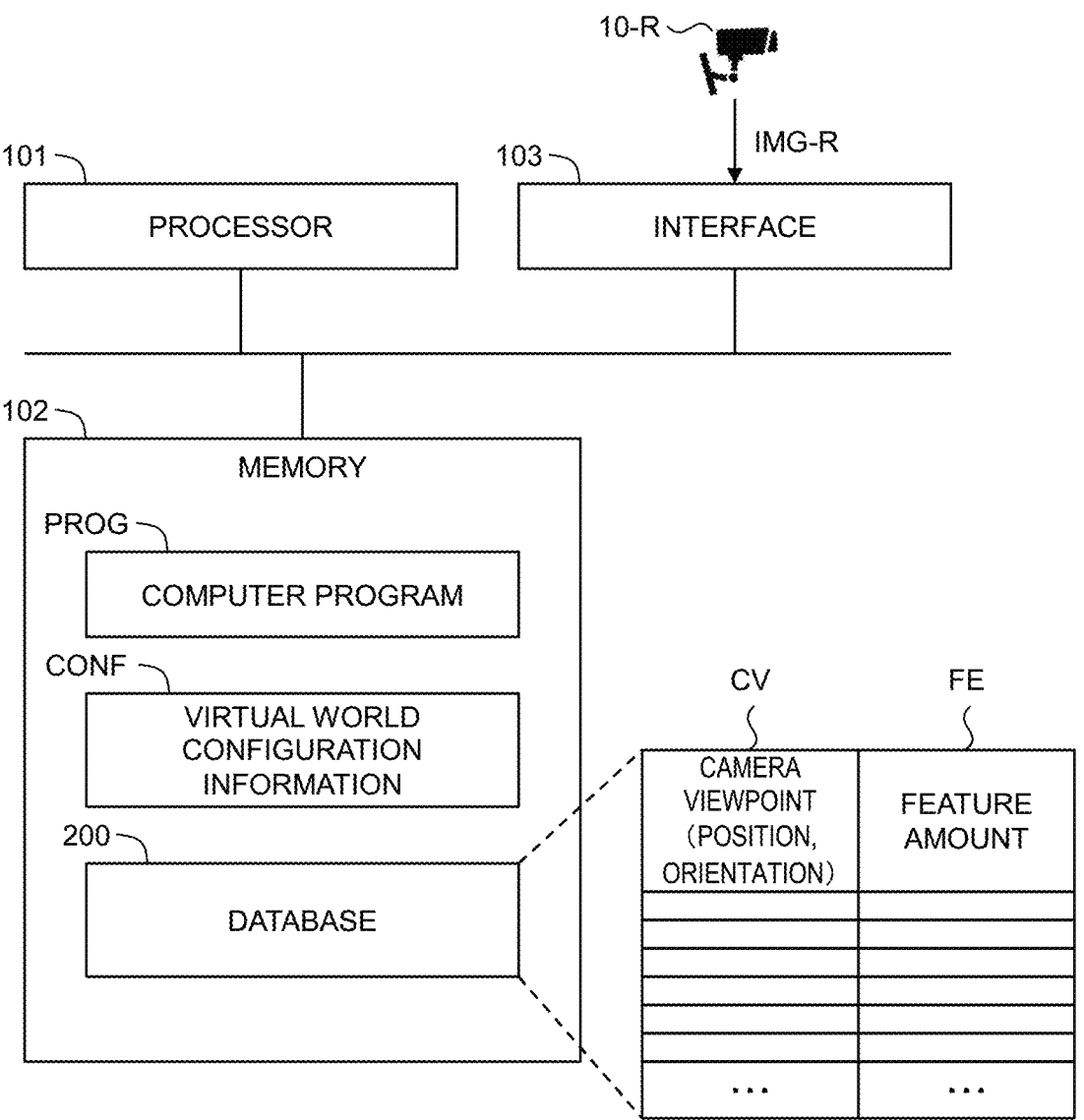
FIG. 4 is a block diagram showing an example of a configuration of a visual positioning system according to an embodiment.

FIG. 4 is a block diagram showing an example of a configuration of the VPS 100 according to the present embodiment. The VPS 100 includes one or more processors 101 (hereinafter, simply referred to as a "processor 101" or "processing circuitry"), one or more memories 102 (hereinafter, simply referred to as a "memory 102"), and an interface 103. The processor 101 executes a variety of processing. For example, the processor 101 includes a central processing unit (CPU). The memory 102 stores a variety of information necessary for the processing. Examples of the memory 102 include a hard disk drive (HDD), a solid state drive (SSD), a volatile memory, and a non-volatile memory. The interface 103 includes a network interface and a user interface.

A computer program PROG is a computer program for the visual positioning. The computer program PROG is stored in the memory 102. The computer program PROG may be recorded on a non-transitory computer-readable recording medium. The computer program PROG is executed by the processor 101. The functions of the VPS 100 may be implemented by a cooperation of the processor 101 executing the computer program PROG and the memory 102.

Virtual world configuration information CONF indicates a configuration of the virtual world WO-V. For example, the virtual world configuration information CONF indicates a three-dimensional arrangement of structures (e.g., roads, road structures, buildings, etc.) in the virtual world WO-V. For example, the three-dimensional arrangement of the structures is expressed by CAD data. The virtual world configuration information CONF is stored in the memory 102.

The processor 101 reproduces the virtual world WO-V on the computer by the use of the DigitalTwin technique. At this time, the processor 101 arranges the structures in the virtual world WO-V based on the virtual world configuration information CONF. In addition, the processor 101 arranges the virtual camera 10-V in the virtual world WO-V. The processor 101 acquires the virtual image IMG-V captured by the virtual camera 10-V based on the virtual world configuration information CONF.

In addition, the processor 101 communicates with the real camera 10-R present in the real world WO-R via the interface 103. The processor 101 acquires the real image IMG-R captured by the real camera 10-R.

Furthermore, the processor 101 generates in advance a database 200 (gallery) used in the visual positioning. The database 200 has a sufficient number of entries. Each entry indicates a correspondence relationship between a camera viewpoint CV and a feature amount FE. The camera viewpoint CV is defined by a combination of a position and an orientation of the camera 10 in the absolute coordinate system. The feature amount FE is extracted by performing the above-described common processing on the image IMG captured by the camera 10. The processor 101 generates the database 200 by performing the common processing on at least one of the real image IMG-R and the virtual image IMG-V. The database 200 is stored in the memory 102.

The processor 101 performs the visual positioning based on the real image IMG-R, the virtual image IMG-V, and the database 200. Hereinafter, examples of the visual positioning will be described.

3-1. First Example

Figure 5:
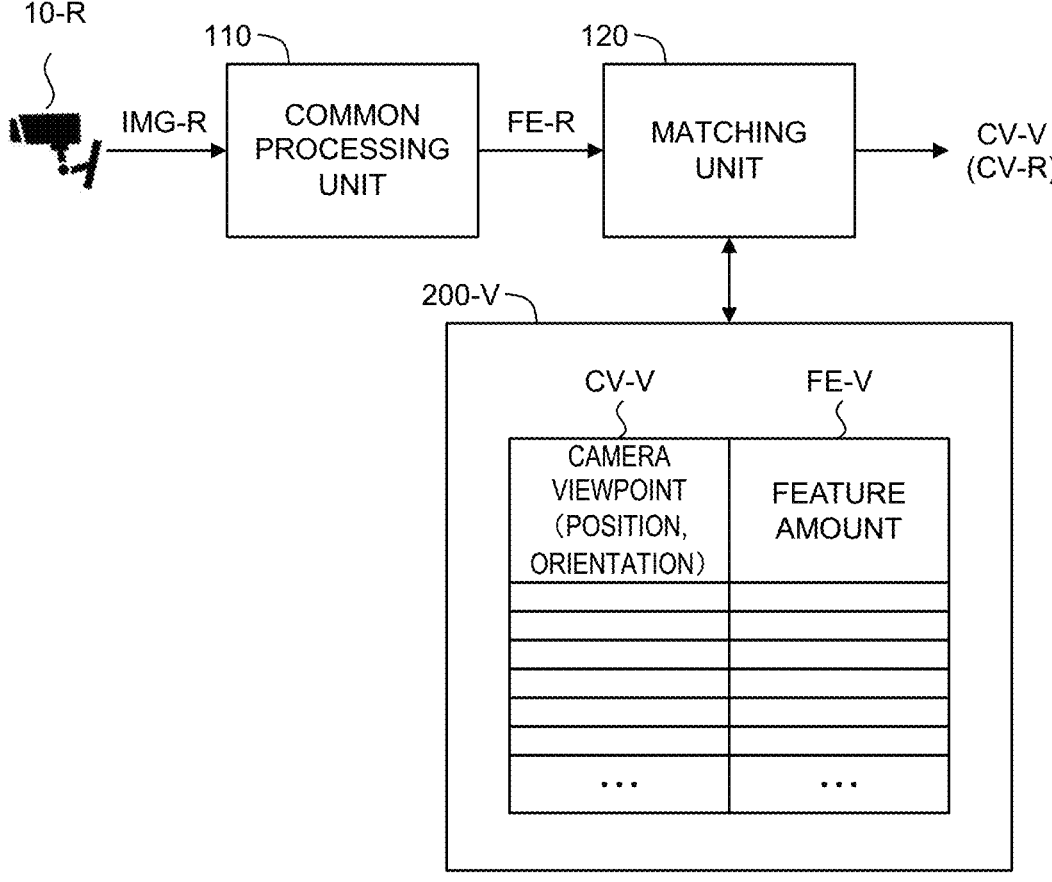
FIG. 5 is a block diagram for explaining a first example of a visual positioning according to an embodiment.

FIG. 5 is a block diagram for explaining a first example of the visual positioning. In the first example, the VPS 100 generates the database 200-V using the virtual image IMG-V captured by the virtual camera 10-V. Each entry of the database 200-V indicates a correspondence relationship between the camera viewpoint CV-V of the virtual camera 10-V and the feature amount FE-V extracted as a result of the common processing on the virtual image IMG-V.

The VPS 100 includes a matching unit 120 in addition to the common processing unit 110 described above. The common processing unit 110 acquires the real image IMG-R captured by the real camera 10-R as the query. The common processing unit 110 extracts the feature amount FE-R by performing the common processing on the real image IMG-R.

The matching unit 120 performs matching between the feature amount FE-R and the feature amount FE-V. More specifically, the matching unit 120 searches the plurality of entries of the database 200-V for a matching entry having the feature amount FE-V that matches the feature amount FE-R. The feature amount FE-V matching the feature amount FE-R means a feature amount FE-V closest to the feature amount FE-R. Then, the matching unit 120 determines that the camera viewpoint CV-V included in the matching entry corresponds to the camera viewpoint CV-R of the real camera 10-R in the real world WO-R. In other words, the matching unit 120 determines that the camera viewpoint CV-R of the real camera 10-R that has captured the real image IMG-R is equal to the camera viewpoint CV-V included in the matching entry. In this manner, the camera viewpoint CV-R in the real world WO-R and the camera viewpoint CV-V in the virtual world WO-V are associated with each other.

According to the first example, the database 200-V is generated based on the virtual image IMG-V. Therefore, coverage of the database 200-V can be easily expanded. This also contributes to improvement in the accuracy of the visual positioning.

According to the first example, the camera viewpoint CV-V in the virtual world WO-V corresponding to the camera viewpoint CV-R of the real camera 10-R that has captured the real image IMG-R is obtained. This makes it possible to project, for example, instances (e.g., persons, vehicles, and objects) shown in the real image IMG-R onto the virtual world WO-V.

3-2. Second Example

Figure 6:
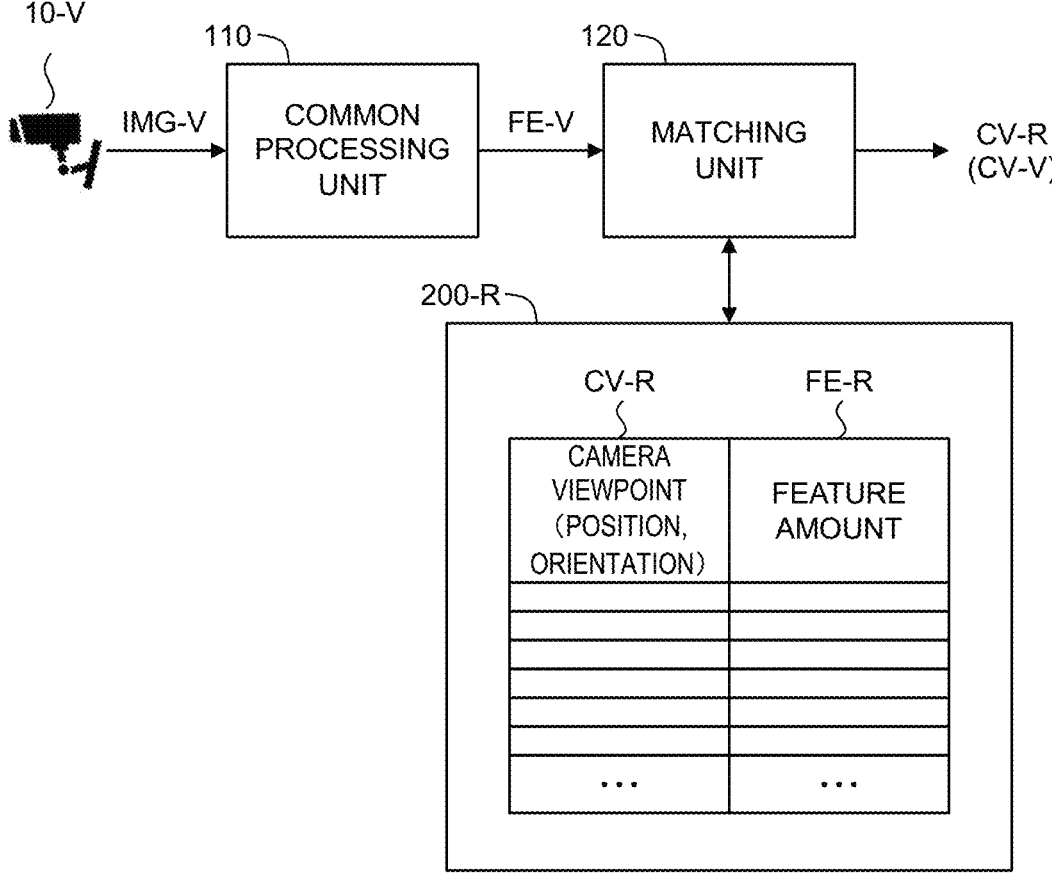
FIG. 6 is a block diagram for explaining a second example of a visual positioning according to an embodiment.

FIG. 6 is a block diagram for explaining a second example of the visual positioning. In the second example, the VPS 100 generates the database 200-R using the real image IMG-R captured by the real camera 10-R. Each entry of the database 200-R indicates a correspondence relationship between the camera viewpoint CV-R of the real camera 10-R and the feature amount FE-R extracted as a result of the common processing on the real image IMG-R.

The common processing unit 110 acquires the virtual image IMG-V captured by the virtual camera 10-V as the query. The common processing unit 110 extracts the feature amount FE-V by performing the common processing on the virtual image IMG-V.

The matching unit 120 performs matching between the feature amount FE-V and the feature amount FE-R. More specifically, the matching unit 120 searches the plurality of entries of the database 200-R for a matching entry having the feature amount FE-R that matches the feature amount FE-V. The feature amount FE-R matching the feature amount FE-V means a feature amount FE-R closest to the feature amount FE-V. Then, the matching unit 120 determines that the camera viewpoint CV-R included in the matching entry corresponds to the camera viewpoint CV-V of the virtual camera 10-V in the virtual world WO-V. In other words, the matching unit 120 determines that the camera viewpoint CV-V of the virtual camera 10-V that has captured the virtual image IMG-V is equal to the camera viewpoint CV-R included in the matching entry. In this manner, the camera viewpoint CV-V in the virtual world WO-V and the camera viewpoint CV-R in the real world WO-R are associated with each other.

According to the second example, the camera viewpoint CV-R in the real world WO-R corresponding to the camera viewpoint CV-V of the virtual camera 10-V that has captured the virtual image IMG-V is obtained. For example, future of the virtual world WO-V is predicted by simulation in the DigitalTwin. When a future event is detected based on the virtual image IMG-V, the future event can be overlaid on the real image IMG-R captured by the real camera 10-R.

3-3. Generalization

The first example and the second example described above are generalized as follows. A first world WO-1 is one of the real world WO-R and the virtual world WO-V. A second world WO-2 is the other of the real world WO-R and the virtual world WO-V. A first camera 10-1 is the camera 10 in the first world WO-1, and is one of the real camera 10-R and the virtual camera 10-V. A second camera 10-2 is the camera 10 in the second world WO-2, and is the other of the real camera 10-R and the virtual camera 10-V. A first image IMG-1 is the image IMG captured by the first camera 10-1. A second image IMG-2 is the image IMG captured by the second camera 10-2.

The VPS 100 performs the common processing. A first feature amount FE-1 is the feature amount FE extracted as a result of the common processing on the first image IMG-1. A second feature amount FE-2 is the feature amount FE extracted as a result of the common processing on the second image IMG-2. The VPS 100 performs matching between the first feature amount FE-1 and the second feature amount FE-2. Then, the VPS 100 associates the camera viewpoint of the first camera 10-1 in the first world WO-1 and the camera viewpoint of the second camera 10-2 in the second world WO-2 with each other based on a result of the matching.

The database 200 is generated based on the first image IMG-1 captured by the first camera 10-1. Each entry of the database 200 indicates a correspondence relationship between the camera viewpoint CV-1 of the first camera 10-1 and the first feature amount FE-1. The VPS 100 extracts the second feature amount FE-2 by performing the common processing on the second image IMG-2 captured by the second camera 10-2. The VPS 100 searches the plurality of entries of the database 200 for a matching entry having the first feature amount FE-1 that matches the second feature amount FE-2. The first feature amount FE-1 matching the second feature amount FE-2 means the first feature amount FE-1 closest to the second feature amount FE-2. Then, VPS 100 determines that the camera viewpoint CV-2 of the second camera 10-2 in the second world WO-2 is equal to the camera viewpoint CV-1 included in the matching entry.

What is claimed is:

1. A visual positioning system for identifying a position based on an image captured by a camera, wherein a first world is one of a real world or a virtual world simulating the real world, a second world is another of the real world or the virtual world, a first image is an image captured by a first camera in the first world, and a second image is an image captured by a second camera in the second world, the visual positioning system comprising processing circuitry, wherein the processing circuitry is configured to:

execute common processing that generates a scene graph representing a positional relationship between objects included in the image and extracts a feature amount of the scene graph;

perform matching between a first feature amount extracted as a result of the common processing on the first image and a second feature amount extracted as a result of the common processing on the second image; and associate a position of the first camera in the first world and a position of the second camera in the second world with each other based on a result of the matching.

2. The visual positioning system according to claim 1, further comprising one or more memories configured to store a database having a plurality of entries, wherein each of the plurality of entries indicates a correspondence relationship between the first feature amount and a camera viewpoint including a position and an orientation of the first camera, and the processing circuitry is further configured to:

extract the second feature amount by executing the common processing on the second image;

search the plurality of entries of the database for a matching entry having the first feature amount that matches the second feature amount; and determines that a camera viewpoint of the second camera in the second world is equal to the camera viewpoint included in the matching entry.

3. The visual positioning system according to claim 1, wherein the objects are static objects.

4. The visual positioning system according to claim 1, wherein the common processing includes detecting the objects included in the image by performing semantic segmentation.

5. The visual positioning system according to claim 1, wherein the common processing includes acquiring a depth map of the image and generating the scene graph representing a three-dimensional positional relationship between the objects based on the depth map.

* * * * *